United States Patent
Gebhard et al.

[15] 3,670,454
[45] June 20, 1972

[54] VERTICAL DROP VENT WINDOW SYSTEM

[72] Inventors: Harold C. Gebhard, Livonia; William B. Schueren, Detroit, both of Mich.

[73] Assignee: Ford Motor Company, Dearborn, Mich.

[22] Filed: May 3, 1971

[21] Appl. No.: 139,479

[52] U.S. Cl. .................................49/103, 49/227, 49/349
[51] Int. Cl. ...........................................E05f 5/10
[58] Field of Search...............49/73, 103, 374, 227, 348–351

[56] References Cited

UNITED STATES PATENTS

| | | | |
|---|---|---|---|
| 2,122,963 | 7/1938 | Susor | 49/103 |
| 2,863,658 | 12/1958 | Moyes | 49/73 |
| 2,955,817 | 10/1960 | Campbell et al. | 49/103 |

*Primary Examiner*—Kenneth Downey
*Attorney*—John R. Faulkner and John J. Roethel

[57] ABSTRACT

A window regulator mechanism for raising and lowering in a window opening in a vehicle body structure a window panel vertically divided into a ventilation section and a visibility section. The window regulator mechanism may be manually or power operated to function to raise or lower both panel sections in controlled sequence. With the window panel in raised condition, actuation of the window regulator mechanism results in the ventilation or smaller panel section being lowered into the body structure to provide a ventilation exhaust opening. During the travel of the ventilation section into the body structure, the visibility or larger panel section remains locked in a fully raised position by a latch mechanism. When the smaller panel section reaches a predetermined down position, the latch mechanism is released allowing the larger panel section to travel to a full down position. Upon movement of the window panel from its lowered position to a raised position, a reverse sequence occurs during which the larger panel section again first becomes locked in a fully raised position as the smaller panel section continues to move out of the body structure into its fully raised position.

16 Claims, 5 Drawing Figures

INVENTORS.
Harold C. Gebhard
William B. Schueren
BY John R. Faulkner
John J. Roethel
ATTORNEYS.

VERTICAL DROP VENT WINDOW SYSTEM

BACKGROUND OF THE INVENTION

Starting in the mid-1930's, the front doors of many automobile bodies made in the United States were equipped with a ventilation window pivotable about a substantially vertical axis and a conventional main window that could be vertically raised and lowered relative to the window opening. With the advent of wrap-around windshields and windshields having a greater rearward inclination, the use of pivoted vent windows fell somewhat in disfavor. It was difficult to hinge the sharply triangulated piece of glass that had to be used. The pivoted vent window preferably required an upstanding frame structure on the door. This created a conflict with a desire to use frameless windows, particularly in the hardtop models. As a result, the pivoted vent window was eliminated in many models and the front door window became a large frameless piece of glass.

The elimination of the pivoted vent window has been found not to be wholly acceptable. The pivoted vent window provided a desirable exhaust flow of air from the vehicle interior that has not been duplicated by other systems. As recognized in U.S. Pat. No. 1,770,747 issued July 15, 1930 to William D. Crowell, the area immediately to the rear of the vehicle windshield pillar is a low pressure area when a vehicle is moving. An opening in this area provides an efficient means for exhausting air from the vehicle interior. The Crowell patent disclosed a vertical division of the window panel into independently movable sections so that the forward section could be raised or lowered to provide the desired amount of exhaust opening. In the Crowell disclosure, each window panel section was operated by an independent window regulator mechanism and each panel section was guided within fixed guide bars including a fixed division bar between the two sections.

It is an object of the present invention to provide a substantially frameless window vertically divided into a small ventilation section and a large visibility section, the sections being raised and lowered by a single window regulator mechanism constructed and arranged to provide for movement of the ventilation section from a closed to a fully opened position, or any intermediate position therebetween, without corresponding movement of the visibility section. Further operation of the mechanism results in movement of the visibility section from a fully raised to a fully lowered or any intermediate position therebetween.

Movement of the ventilation section is guided in part on a guiding and sealing member secured to the front edge of the visibility section. When the visibility section is lowered, the entire window opening is unobstructed since the guiding and sealing member is carried into the window well with the visibility section of the window panel.

SUMMARY OF THE INVENTION

This invention is concerned with the relationship of a vehicle body having a window opening, a window panel vertically divided into a ventilation section and a visibility section, and a window regulator mechanism for sequentially vertically raising and lowering the window pane sections into and out of the window opening. The window regulator mechanism comprises a first drive arm coupled to the ventilation section and a second drive arm coupled to the visibility section. A drive means coupled to the drive arms is operable to sequentially lower the ventilation section to a full ventilation position independently of the visibility section and then to lower the ventilation and visibility section together to a fully lowered position of the latter. The window regulator mechanism includes a latch means coupled to the second drive arm and engageable with a keeper device to hold the second drive arm against movement until the ventilation section is lowered through movement of the drive means a predetermined distance to its full ventilation position. A latch control means becomes operable upon movement of the drive means a predetermined distance to release the latch means and render the drive means operative to move the panel sections to fully lowered position.

The sequence of movement of the ventilation and visibility sections is reversed upon the latch means becoming operative to hold the visibility panel against movement beyond its fully raised position as the ventilation section continues its upward movement.

In the preferred form of the mechanism, the drive means comprises a compound gear sector having a first set of gear teeth drivingly engaged by a drive pinion and a second set of gear teeth drivingly engaged with a set of gear teeth on the first drive arm. The second set of gear teeth and the set of gear teeth on the first drive arm comprise variable ratio gearing to compensate for the fact that the visibility section remains immovable as the ventilation section moves to a concealed position within the window well after which the visibility section moves at a rate to make certain that it overtakes and bottoms out at the same time as the ventilation section.

The geometrical relationship of the gear sector and the drive arms are such that upon the window regulator mechanism being actuated to lower the window panel, a point of connection of the first drive arm coupled to the ventilation section moves downwardly through a predetermined distance in which the ventilation section is dropped out of sight beneath the window opening. At this point, the main or visibility section drive arm becomes unlatched and both sections moved down into the window well. Because of the variable ratio gearing between the gear sector and first drive arm, the ventilation section moves at a decreasing rate relative to the visibility section so that both sections bottom out at the same time.

DESCRIPTION OF THE DRAWINGS

Other objects, advantages and features of the present invention will become more apparent as this description proceeds, reference being had to the accompanying drawings, wherein;

FIG. 5 is a section view on the line 5—5 of FIG. 2.

DETAINED DESCRIPTION OF THE INVENTION

Figure 1:
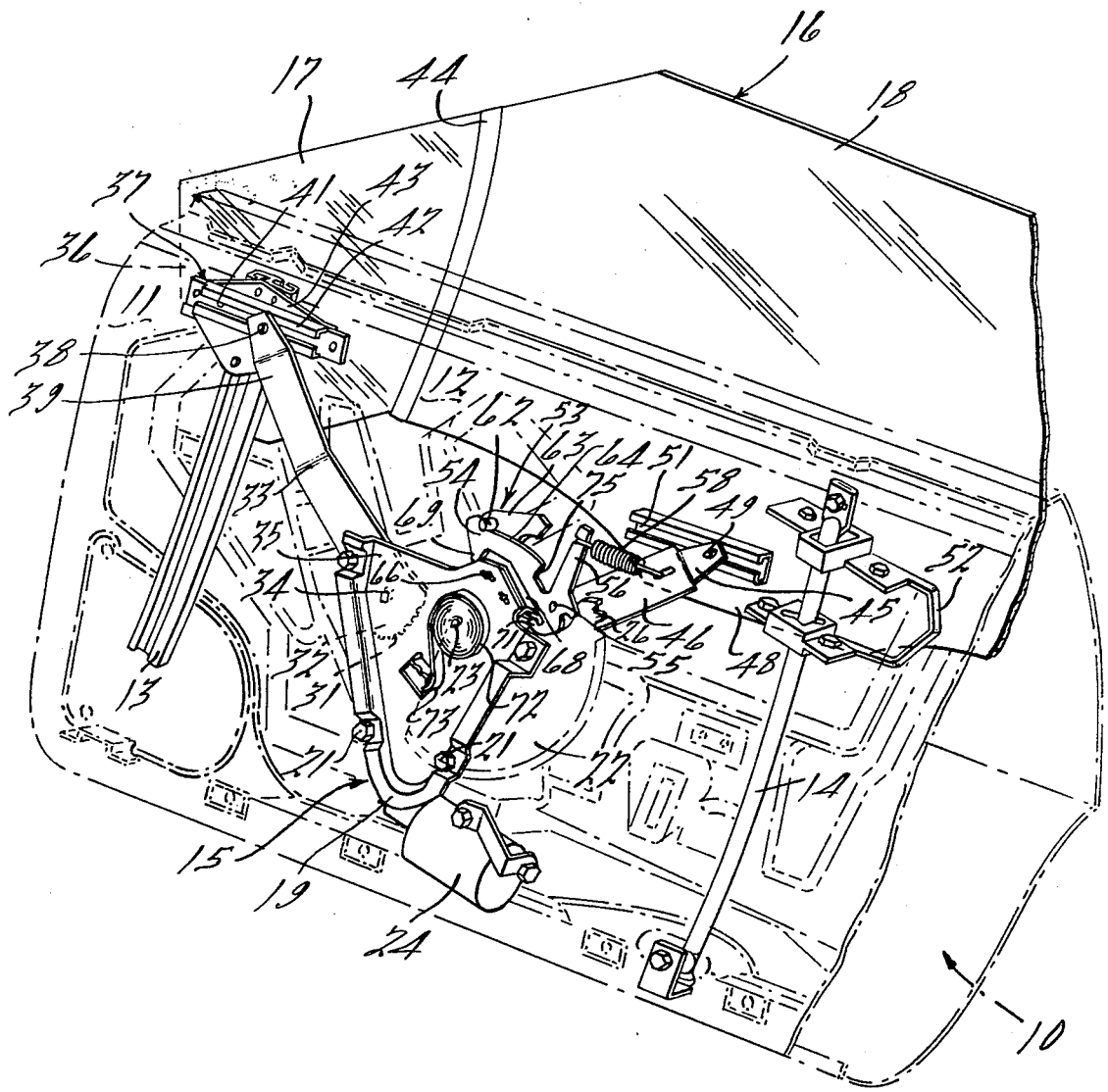
FIG. 1 is a fragmentary perspective view of a vehicle body structure, e.g., a vehicle door, having a sectional window panel mounted therein adapted to be raised and lowered by a window regulator mechanism embodying the present invention.

Referring now to the drawings, there is illustrated in dot and dash outline a portion of a vehicle body structure, such as a door, generally designated 10. The body structure has inner and outer panels 11 and 12, respectively, between and on which various mechanical hardware items such as the door latch mechanism and hinges, none of which is shown, a window guide assembly 13, a door glass run and bracket assembly 14, and a window regulator mechanism generally designated 15 embodying the present invention are mounted. The window panel, generally designated 16, is vertically divided into at least two sections, a small front ventilation section 17 and a much larger main or visibility section 18.

As in a conventional vehicle installation, window panel 16 is adapted to be raised and lowered relative to a window well in the vehicle body structure or door 10. In accordance with the present invention, the window regulator mechanism 15 is constructed and arranged to lower and raise the window panel sections 17 and 18 in sequential movement, as will be more fully explained.

The window regulator mechanism 15 comprises an inverted substantially triangular mounting plate 19 adapted to be mounted as by bolts 21 to the inner door panel 11. A gear sector or quadrant 22 is carried on a pivot shaft 23 journalled in the mounting plate 19, the gear sector and pivot shaft being nonrotatably coupled to each other. Gear sector or quadrant 22 is illustrated as being drivable in window raising or lowering directions by an electric motor and reduction gear unit 24. This is a conventional power operated window regulator mechanism drive unit and a detailed description is not considered necessary. It should also be understood that the gear sector 22 could be rotated by a conventional hand crank driven pinion.

Whether motor driven or hand driven, the drive pinion 25 is in mesh with a serious of teeth 26 on the periphery of the gear sector 22.

Coaxially mounted with the gear sector 22 on the pivot shaft 23 is a drive gear 27. This drive gear 27 is riveted by rivets 28 to the gear sector 22 although it will be understood that the gear sector 22 and drive gear 27 could be an integral stamping. The gear sector 22 and the attached or integral drive gear 27 form a compound gear.

The drive gear 28 is a noncircular gear in that its gear teeth 29 follow an eccentric pattern of decreasing radii about the center of rotation as defined by the pivot shaft 23. The gear teeth 29 mesh with a complementary set of gear teeth 31 carried on the end 32 of a drive arm 33 which hereinafter may be referred to as the first drive arm. The gear teeth 31 are complementary to the drive gear teeth 29 in that they follow an eccentric pattern of increasing radii from the center of swinging movement of the drive arm 33. The drive arm 33 is swingable about a pivot stud 34 carried on the upper left hand corner 35 of mounting plate 19.

Circular sets of gear teeth 29 and 31 could be used in place of the noncircular gear teeth arrangement by having the pitch circles of the gear sets rotatable about eccentric axes. The function of the variable ratio gearing, whether it be the noncircular type illustrated or the eccentric axes type, is to drive the first drive arm 33 at a changing rate relative to the gear sector 22, for a purpose to be explained.

The first drive arm 33 is coupled to the lower edge 36 of the ventilation section panel 17 through a roller and channel connection, generally designated 37. The roller 38 is carried on the free end 39 of the first drive arm 33 and is laterally movable in a slot 41 in the channel member 42. The channel 42 is carried on a bracket 43 which has vertically aligned rollers (not visible) which engage the window guide assembly 13. The ventilation section 17 is also guided in its up and down movements relative to the visibility section 18 by a sealing channel 44 secured to the front end of the visibility section.

The main or visibility section 18 is coupled to the outer end 45 of a second drive arm 46 which at its inner end 47 is journalled for swinging movement on the pivot shaft 23 supporting the gear sector or quadrant 22. The outer end 45 is coupled to the lower edge 48 of the visibility panel 18 by a roller (not visible) rotatably journalled at 49, the roller being laterally movable in a channel 51.

The channel 51 is part of a bracket 52 secured to the lower edge of the large or visibility panel section 18. The bracket 52 is a part of the door glass run and bracket assembly 14 which guides the rear portion of the window panel 16 as the latter is raised and lowered between the inner and outer body structure or door panel 11 and 12. The details of construction of the door glass run and bracket assembly 14 form no part of the present invention.

Since the second drive arm 46 is freely swingable about the pivot shaft 23, it is of itself incapable of supporting the weight of the large visibility panel section 18. Accordingly, an important feature of the present invention is the provision of a latch device, generally designated 53, adapted to hold the second drive arm 46 against movement relative to the gear sector 22 during a predetermined movement phase of the latter and to couple the second drive arm to the gear sector during a further movement phase of the latter.

Figure 2:
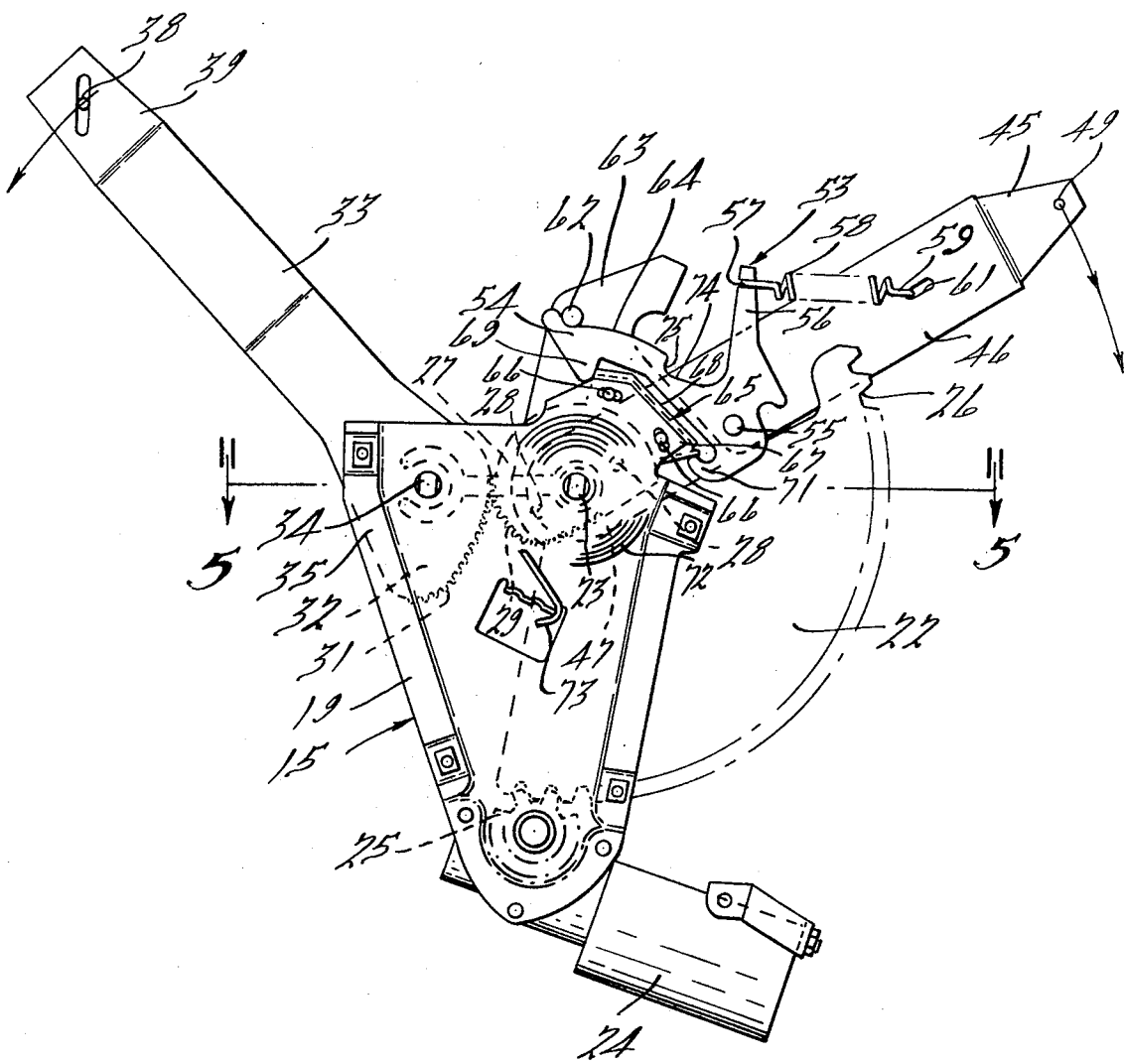
FIG. 2 is a fragmentary plan view illustrating the window regulator mechanism in window panel raised position.
Figure 4:
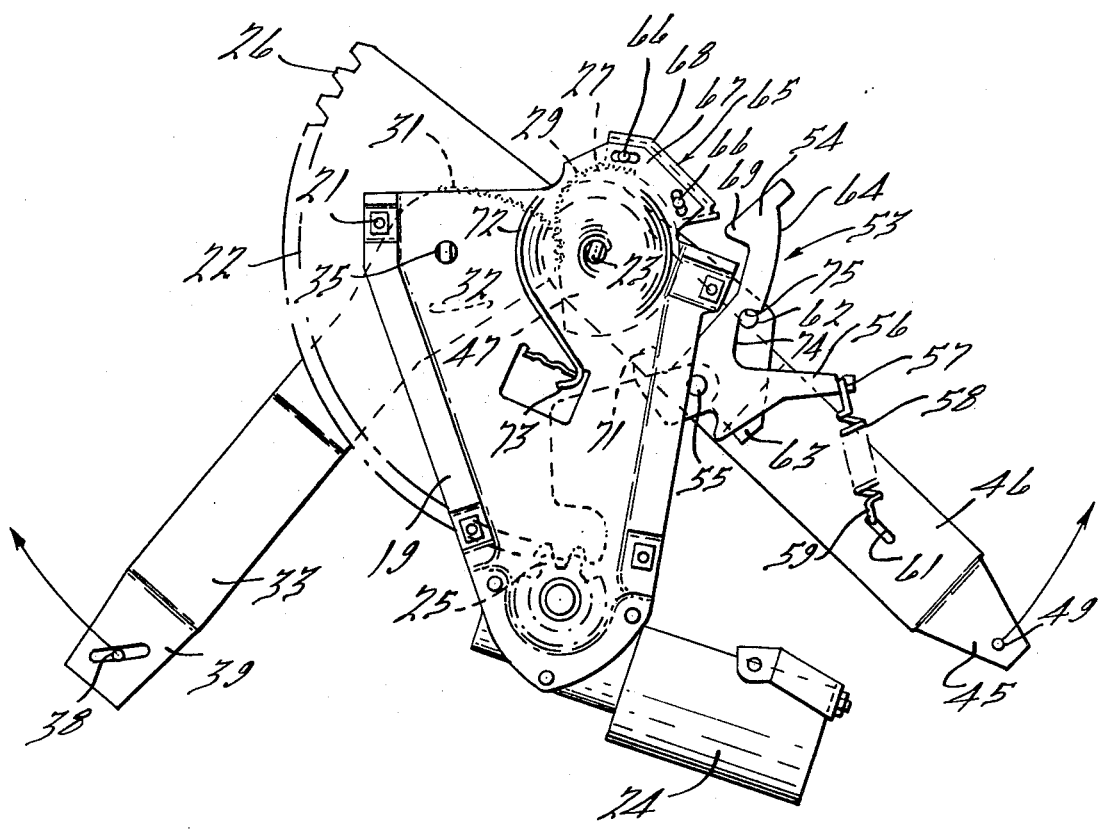
FIG. 4 is a plan view of the parts of the window regulator mechanism when both the ventilation and visibility sections are in their lowermost position within the vehicle body structure.

As best seen in FIGS. 2 and 4, inclusive, the latch mechanism 53 comprises a multi-arm detent or pawl member 54 pivotally supported on a pivot stud 55 carried on the second drive arm 46. The detent member 54 has an upstanding arm 56 to which one end 57 of a tension spring is anchored, the other end 59 of the spring being anchored to an edge of an aperture 61 in the second drive arm 46. The spring 58 exerts a clockwise force on the detent member 54, as viewed in the drawings.

As seen in FIG. 2, clockwise rotation of the detent member 54 is adapted to be limited by a stop 62 carried on an extension 63 of the gear sector or quadrant 22. The stop 62 is further adapted to ride over a cam surface 64 on the upper portion of the detent member 54. A stop assembly 65 is held by bolts 66 to an upper extension 67 of the mounting plate 19.

Stop assembly 65 has a flange 68 each end of which is adapted to be engaged by abutments 69 and 71 carried on the underside of the detent or pawl member 54. In effect, the abutments 69 and 71 straddles the stop assembly 65, for purposes to be explained.

The pivot shaft 23 is coupled to a flat spiral spring 72, the free end 73 of which is anchored to the mounting plate 19. As in conventional window regulator mechanism practice, the spiral spring 72 is wound up as the shaft 23 is rotated in a clockwise direction and functions to counterbalance the weight of the visibility panel.

OPERATION

Referring now to FIGS. 1 and 2, the window panel 16 in its entirety is shown in a raised position relative to the vehicle body or door structure 10. That is, both the ventilation or small panel section 17 and the visibility or large panel section 18 are in their raised position and the related drive arms of the window regulator mechanism are in corresponding raised position.

If it is now desired to provide exhaust ventilation through the ventilation panel 17, this can be accomplished by actuating the electric motor and reduction gear unit 24 to dive the gear sector 22 in a clockwise direction, as viewed in the drawings.

Clockwise rotation of the gear 22 results in two things happening. Through the intermeshed relationship of the gear teeth 29 on the drive gear 27 and the gear teeth 31 on the first drive arm 33, the latter is swung in a counterclockwise direction. The ventilation section accordingly is moved downwardly. Simultaneously, the stop or cam follower 62 moves from left to right across the cam surface 64 on the latch member 54 preventing the latter from disengaging from the stop assembly 65. Since the latch device 53 is directly coupled to the second drive arm 55, the latter is held against movement relative to the mounting plate 19 and the visibility section remains in an up position in the body structure or door 10.

Figure 3:
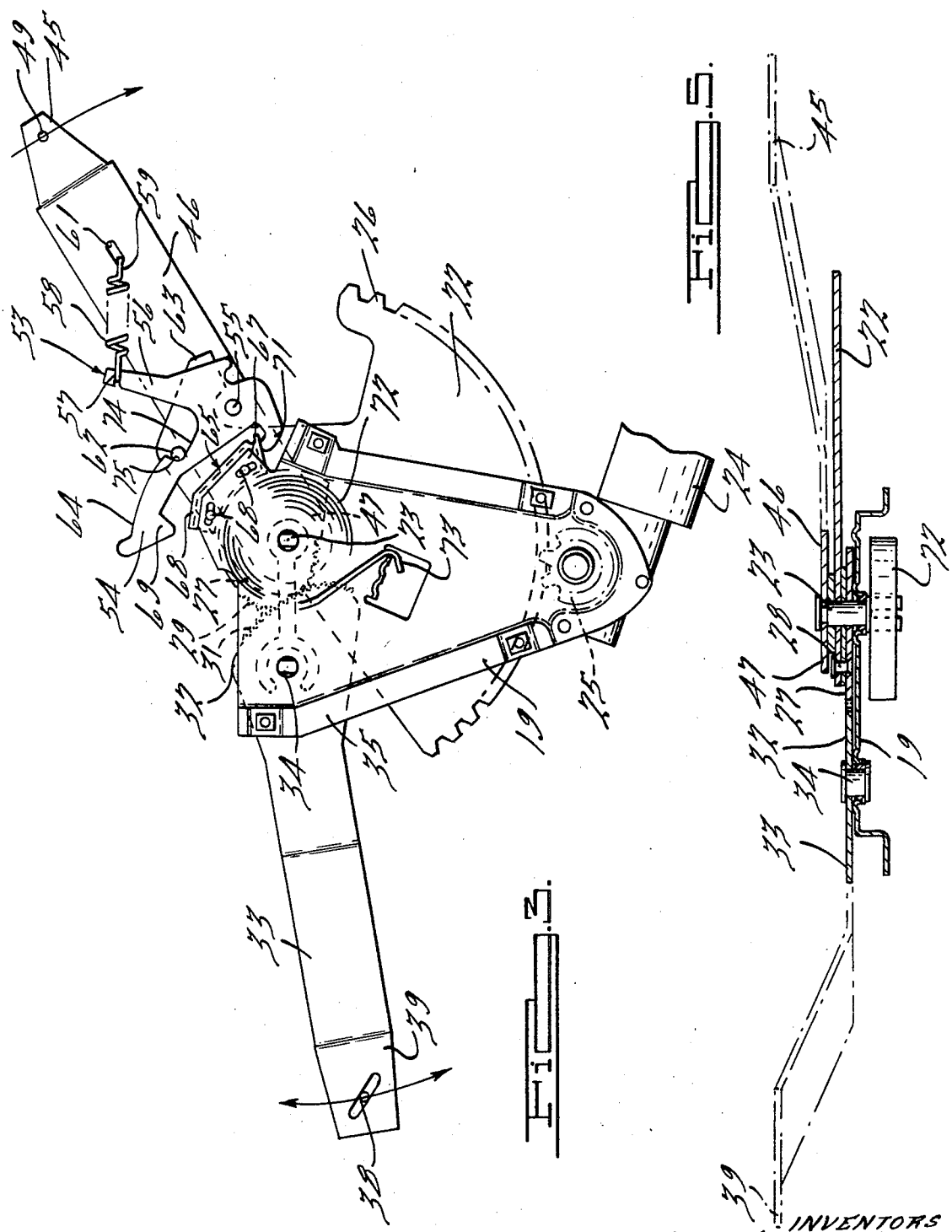
FIG. 3 is a plan view of the window regulator mechanism illustrating the parts thereof in the relationship in which the ventilation section of the window panel has been lowered and the visibility section has been released from the latch mechanism holding it against downward movement.

Referring now to FIG. 3, the relationship of the window regulator components is shown as they appear after the ventilation section having been dropped a predetermined distance into the window well. Preferably, the drive arm 33 movement has been such that the upper edge of the ventilation section 17 is below the window sill level. At this point, the stop or cam follower 62 has traveled over the cam surface 64 to the end of the latter and momentarily overlies a notch or step-down surface 74 on the detent arm member 54. The spring 68 causes the pawl or detent member 54 to move in a clockwise direction to the position shown in FIG. 3. In this position, the abutment 69 on the detent or pawl member disengages from the stop assembly 65 and the support of the second drive arm is transferred to the gear sector 22 through the abutting relationship of the stop 62 with the edge 75 of the pawl or detent member notch 74. The flat spiral spring 72 becomes operative as the counterbalance for the weight of the second drive arm 46 and the visibility section panel 18. The visibility panel section 18 now is in condition to be lowered into the window well.

Lowering movement of the visibility panel 18 occurs upon continued rotation of the gear sector or quadrant 22 in a clockwise direction. The ultimate relationship of the first and second drive arms is that shown in FIG. 4. It will be noted that the second drive arm 46 has substantially twice as far to go as the first drive arm 33 from the intermediate FIG. 3 position to the ultimate FIG. 4 position. As was explained above, the drive gear 27 and the gear portion 32 of the first drive arm 33 have a variable gear ratio whereby the rate of movement of the first drive arm decreases as the ventilation panel section 17 moves from its raised to its lowered position. Gear sector 22, of course, continues to move at a constant rate. Since the second drive arm 46 is now coupled to the gear sector 22, the latter moves at the same rate as the gear sector. The variable gear ratio relationship between the drive gear 27 on the gear sector and the gear teeth on the end of the arm 33 is such that the drive arm 46 catches up with the first arm 33 so that both panel sections achieve the fully down position simultaneously.

The reverse operation of the window regulator mechanism, i.e., the actuation of the mechanism to raise the window panel from lowered to fully raised position is caused by electric motor unit 24 being actuated to drive the gear sector in a counterclockwise direction. On counterclockwise movement of the gear sector 22, both arms are swung in counter up directions causing them to be raised. The second drive arm 46 moves at a faster rate than the first drive arm 33 so that the visibility panel section 18 reaches a fully raised position as the ventilation panel section 7 achieves a position just beneath the window opening. As soon as the visibility panel section 18 is fully raised, the abutment 71 on the latch device 53 engages the stop assembly 65 and causes the detent or pawl member 54 to be pivoted in a counterclockwise direction against the resistance of the spring 58 to the latched position shown in FIG. 2. The visibility section 18 is now held against movement. The stop or cam follower 62 engages the cam surface 64 on top of the pawl or detent member 54 and moves thereover from right to left as viewed in the drawings to lock the same against displacement in unlatching direction. The gear sector continues to rotate in a counterclockwise direction, the drive gear 27 through its intermeshed relationship with the gear teeth on the end 32 of the drive arm 33 causes the latter to continue to swing upwardly to raise the ventilation panel. Such movement continues until the condition shown in FIGS. 1 and 2 is achieved and the window panel 16 as a unit now closes the window opening.

It is to be understood that this invention is not limited to the exact construction illustrated and described above, but that various changes and modifications may be made without departing from the spirit and scope of the invention as defined in the appended claims.

We claim:

1. A window regulator mechanism for raising and lowering in a window opening in a vehicle body structure a window panel vertically divided into a ventilation section and a visibility section,
    the window regulator mechanism comprising a first drive arm coupled to the ventilation section and a second drive arm coupled to the visibility section,
    variable ratio gear drive means coupled to the drive arms operable to sequentially lower the ventilation section to a full ventilation position and to then lower the ventilation and visibility sections together to a fully lowered position,
    latch means coupled to the second drive arm engageable with a keeper device to hold the second drive arm against movement until the ventilation section is lowered through movement of the drive means a predetermined distance to its full ventilation position,
    and latch control means operable upon movement of the drive means the predetermined distance to release the latch means and render the drive means operative to move the panel sections to fully lowered position with both sections reaching an ultimate lowered position substantially simultaneously.

2. A window regulator mechanism according to claim 1, in which:
    the drive means comprises a compound gear sector having a first set of gear teeth drivingly engaged by a drive pinion and a second set of gear teeth drivingly engaged with a set of gear teeth on the first drive arm,
    the second set of gear teeth and the set of gear teeth on the first drive arm comprising the gear sets having the variable ratio effective to control the movement rate of the first drive arm relative to the movement of the second drive arm.

3. A window regulator mechanism according to claim 2, in which:
    the latch means includes a pawl member pivotally mounted on the second drive arm,
    and spring means biases the pawl member out of latching engagement with the keeper device.

4. A window regulator mechanism according to claim 3, in which:
    the latch control means comprises coacting cam elements on the pawl member and the gear sector operative to cam the pawl member against the spring means bias into latching engagement with the keeper device in timed relationship to movement of the gear sector.

5. A window regulator mechanism according to claim 1, in which:
    the latch means includes a pawl member pivotally mounted on the second drive arm,
    and spring means biases the pawl member out of latching engagement with the keeper device.

6. A window regulator mechanism according to claim 5, in which:
    the latch control means comprises coacting cam elements on the drive means and the pawl member operative to cam the latter against the spring means bias into latching engagement with the keeper device during drive means movement causing movement of the ventilation section independently of movement of the visibility section.

7. A window regulator mechanism according to claim 1, in which:
    the latch control means comprises coacting cam elements on the drive means and a latching element of the latch means operative to cam the latter into latching engagement with the keeper device during the phase of drive means movement causing movement of the ventilation section.

8. A window regulator mechanism for raising and lowering in a window opening in a vehicle body structure a window panel vertically divided into a ventilation section and a visibility section,
    the window regulator mechanism comprising a support plate pivotally mounting a pair of drive arms,
    a first one of the drive arms being coupled to the ventilation section and the second drive arm being coupled to the visibility section,
    variable ratio gear drive means carried on the support plate,
    the drive means being directly coupled to the first drive arm and being coupled to the second drive arm through a latch means,
    the latch means being operative to hold the second drive arm against lowering movement of the visibility panel section until the drive means in driving the first drive arm lowers the ventilation section to a fully opened ventilation position,
    and latch control means operative upon the ventilation section being lowered to its fully opened ventilation position to release the second drive arm and render the drive means operative to move the panel sections as a unit to fully lowered position relative to the window opening with both sections substantially simultaneously reaching an ultimate lowered position.

9. A window regulator mechanism according to claim 8, in which:

the drive means includes a gear sector having a first set of gear teeth engaged by a drive pinion operable to drive the gear sector in counter directions of rotation, and the gear sector having a second set of gear teeth in mesh with a set of gear teeth on the first drive arm to form the direct coupling between the latter and the drive means.

10. A window regulator mechanism according to claim 9, in which:

the latch means includes a pawl member pivotally mounted on the second drive arm, a keeper device fixedly mounted on the support plate, and spring means biasing the pawl member out of latching engagement with the keeper device.

11. A window regulator mechanism according to claim 10, in which:

the latch control means comprises coacting cam elements on the pawl member and the gear sector operative to cam the pawl member against the spring means bias into latching engagement with the keeper device during the phase of gear sector movement for driving the ventilation window between its closed and ventilation positions.

12. A window regulator mechanism according to claim 8, in which:

the latch means includes a pawl member pivotally mounted on the second drive arm, a keeper device fixedly mounted on the support plate, and spring means biasing the pawl member out of latching engagement with the keeper device.

13. A window regulator mechanism according to claim 12, in which:

the latch control means comprises coacting cam elements on the drive means and the pawl member operative to cam the latter into latching engagement with the keeper device during drive means movement causing movement of the ventilation section independently of movement of the visibility section.

14. A window regulator mechanism according to claim 8, in which:

the latch control means comprises coacting cam elements on the drive means and a latching element of the latch means, the coacting cam elements being operative to cam the latching element into latching engagement with a keeper device carried on the support plate during the phase of drive means movement programmed to move the ventilation section independently of the visibility section.

15. A window regulator mechanism according to claim 8, in which:

the latch means includes a pawl member pivotally mounted on the second drive arm and having a keeper device engaging portion and a cam surface portion, a keeper device mounted on the support plate, spring means biasing the pawl member in a direction to hold its keeper device engaging portion out of engagement with the keeper device, and a cam surface engaging means movable with the drive means and engageable with the pawl member cam surface to cam the pawl member in a keeper device engaging direction during movement of the ventilation section between its fully closed and fully opened ventilation position.

16. A window regulator mechanism according to claim 15, in which:

the drive means includes a gear sector engaged by a drive pinion operable to drive the gear sector in counter directions of rotation, and the cam surface engaging means comprises a follower pin carried on the gear sector.

* * * * *